UNITED STATES PATENT OFFICE.

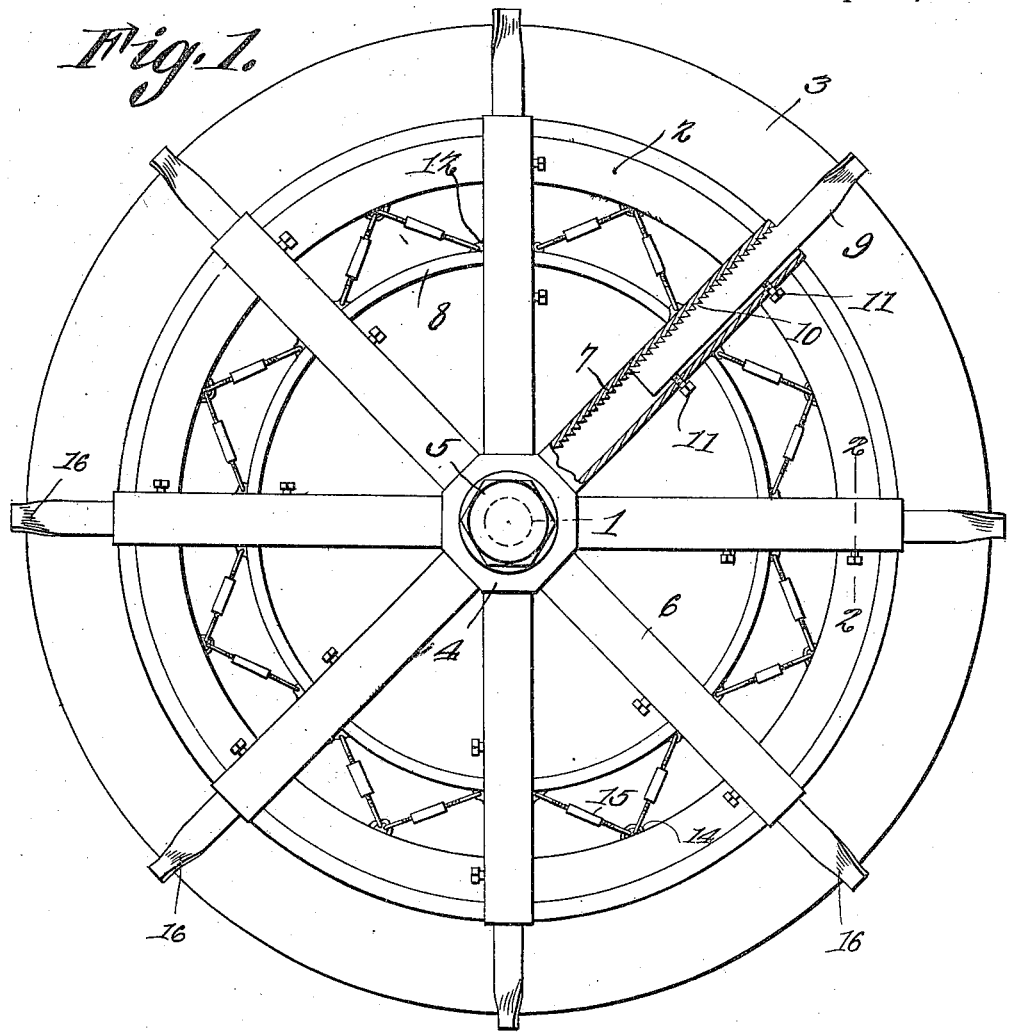

NOBLE R. HOLCOMB, OF KEYSTONE, OKLAHOMA.

ANTISKIDDING DEVICE.

1,301,266.  Specification of Letters Patent.  Patented Apr. 22, 1919.

Application filed September 4, 1917. Serial No. 189,641.

*To all whom it may concern:*

Be it known that I, NOBLE R. HOLCOMB, a citizen of the United States, residing at Keystone, in the county of Pawnee and State of Oklahoma, have invented a new and useful Antiskidding Device, of which the following is a specification.

The device forming the subject matter of this application is adapted to be applied to the wheel of an automobile or other vehicle, for the purpose of preventing skidding.

The invention aims to provide novel means whereby the spuds may be interengaged with the spokes, to permit a radial adjustment of the spuds, and to hold the spuds in adjusted positions.

Another object of the invention is to provide novel means whereby the device may be assembled with a vehicle wheel.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings:—

Figure 1 shows in side elevation, a wheel whereunto the structure forming the subject matter of this application has been applied, parts being broken away;

Fig. 2 is a cross section on the line 2—2 of Fig. 1.

In the drawings, the numeral 1 denotes an axle on which a vehicle wheel is mounted. The rim of the wheel is shown at 2 and carries a tire 3 of any desired sort.

In carrying out the present invention, a hub 4 is mounted on the axle 1 and is retained thereon by a cap nut 5. Tubular spokes 6 radiate from the hub 4 and are secured thereto. The spokes 6 are provided in their interiors with transverse teeth 7 extended longitudinally of the spokes. The teeth 7 project circumferentially of the structure. The spokes 6 may be connected to a rim 8.

Spuds 9 are mounted for endwise adjustment in the spokes 6. The spuds 9 have transverse teeth 10 which project circumferentially of the device. As shown in Fig. 1, the spuds 9 have a slight transverse movement in the spokes 6, parallel to the median plane of the wheel. This permits the teeth 10 on the spuds 9 to be engaged with the teeth 7 on the spokes 6, and to be disengaged therefrom. The spuds 9 do not have a transverse movement in the spokes 6, in a direction at right angles to the median plane of the device.

Clamping devices for holding the spuds 9 advanced, parallel to the median plane of the wheel, are provided, and these clamping devices may be set screws 11 threaded into the spokes 6 and bearing against the spuds 9. Eyes 12 are carried by the rim 8 and are connected with the rim 8 and with the spokes 6. Eyes 14 are carried by the rim 2 of the vehicle wheel. The eyes 14 and 12 are connected by turnbuckles 15 or like tightening devices, in order to hold the anti-skidding structure hereinbefore described, in place against rotation with respect to the wheel of which the rim 2 constitutes a part.

In practical operation, the set screws 11 may be backed out, and the spuds 9 may be moved transversely, thereby to disengage the teeth 10 on the spuds from the teeth 7 on the spokes 6. The spuds 9 may then be adjusted longitudinally, so that they will project at any desired distance with respect to the tire 3. The set screws 11 may then be tightened up, moving the spuds 9 transversely, and causing the teeth 10 on the spuds to engage with the teeth 7 on the spokes 6.

If desired, the spuds 9 may be twisted as shown at 16, so that their ends do not stand parallel to the line of advance of the wheel, or exactly at right angles thereto. As a consequence, the ends of the spuds 9 will not engage between the boards of bridges and the like, which extend either parallel to the line of advance of the wheel, or at right angles thereto.

Having thus described the invention, what is claimed is:

An anti-skidding device comprising a hub; a rim; spokes connecting the hub and the rim; spuds slidable longitudinally on the spokes; means for holding the spuds in adjusted positions; and longitudinally adjustable tightening devices, independent of said means, disposed in zig-zag order about the rim and having their inner ends connected to the rim.

In testimony that I claim the foregoing as my own, I have hereto affixed my signature in the presence of two witnesses.

NOBLE R. HOLCOMB.

Witnesses:
J. F. LEE,
J. J. COLLINS.

Copies of this patent may be obtained for five cents each, by addressing the "Commissioner of Patents, Washington, D. C."